US005428857A

United States Patent [19]

Murray

[11] Patent Number: 5,428,857

[45] Date of Patent: Jul. 4, 1995

[54] IDENTIFIABLE RUBBER BACKED PRODUCT

[75] Inventor: John H. Murray, LaGrange, Ga.

[73] Assignee: Milliken Research Corporation, Spartanburg, S.C.

[21] Appl. No.: 916,643

[22] Filed: Jul. 20, 1992

[51] Int. Cl.$^6$ .................. B32B 3/00

[52] U.S. Cl. .................. 15/217; 15/216; 428/195

[58] Field of Search .................. 15/216, 217; 428/195, 428/493

[56] References Cited

U.S. PATENT DOCUMENTS

| | | | |
|---|---|---|---|
| 2,985,216 | 5/1961 | Williams et al. | 156/277 |
| 3,595,739 | 7/1971 | Meyer | 428/195 |
| 4,125,655 | 11/1978 | Kanzelberger | 428/67 |
| 4,256,159 | 3/1981 | Williams | 40/587 X |
| 4,741,065 | 5/1988 | Parkins | 15/217 |
| 4,767,481 | 8/1988 | Bryant et al. | 156/116 |
| 4,902,554 | 2/1990 | Lang | 428/195 |
| 5,047,110 | 9/1991 | Bryant et al. | 156/116 X |

FOREIGN PATENT DOCUMENTS

| | | | |
|---|---|---|---|
| 040100 | 3/1977 | Japan | 40/587 |
| 0672224 | 6/1978 | Japan | 15/215 |
| 181287 | 6/1922 | United Kingdom | 40/129.1 |

*Primary Examiner*—Timothy F. Simone
*Assistant Examiner*—Patrick Brinson
*Attorney, Agent, or Firm*—Terry T. Moyer; Earle R. Marden

[57] ABSTRACT

A dust control mat having a pile upper surface and a thermosetting rubber or rubber-like backing to which a thin thermoplastic identification strip or label has been vulcanized thereto.

3 Claims, 1 Drawing Sheet

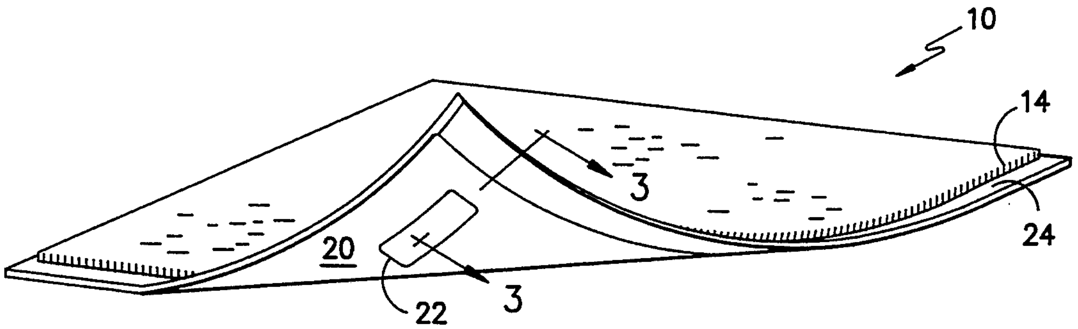
FIG. – 1 –
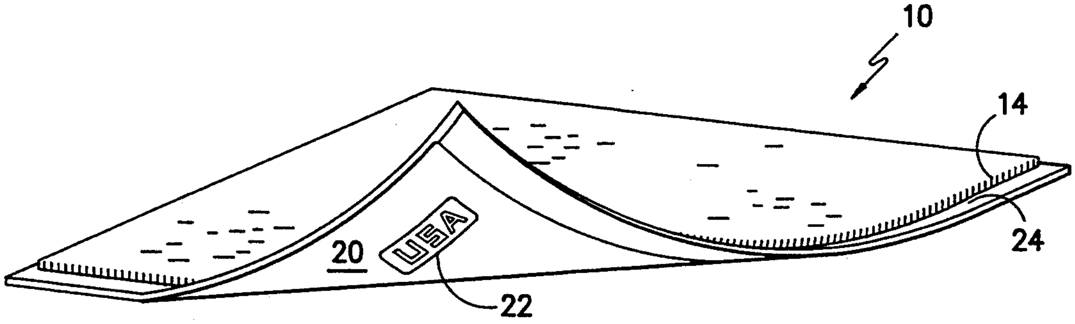
FIG. – 2 –
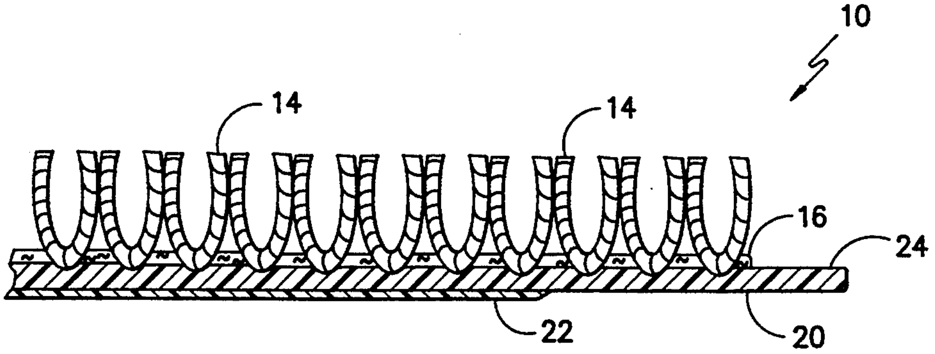
FIG. – 3 –

IDENTIFIABLE RUBBER BACKED PRODUCT

This invention relates generally to rubber-backed dust control floor mats of the type which have a pile surface on one side and a rubber or rubber-like material on the other side. Mats of this type are generally used in access ways where people tend to brush or scrape their feet in order to prevent carrying of moisture and/or dirt, accumulated on their footwear, into other areas of the premises. Normally, these mats are located in areas of high pedestrian traffic, such as doorways. These mats are generally sold by the manufacturer to a rental laundry that, in turn, rents or leases such mats to the ultimate user.

BACKGROUND

Rubber backed mats such as used by the rental laundry industry require that the rental laundry's name be clearly and permanently identified on the bottom side of the rubber backing. It is often desirable to also permanently encode other items such as the date of shipment, or mat style number.

A further requirement of a mat labeling system is that it be possible to accomplish the labeling identity as a final step before packaging and shipping the mat to a customer. The labeling function can be readily accomplished during vulcanization of the nitrile type mat rubber to the pile-textile portion of the mat such as by using metal molds to case the required identification into the rubber. Another possibility during vulcanization is to use preprinted (and protected) or colored rubber (or other polymer based materials) labels compatible with the nitrile rubber backing such that they will be permanently bonded/vulcanized in place. The problem with labeling systems applied during mat vulcanization is that these mats cannot be put in general inventory since they are already identified for a particular customer.

For mats that are first put in general inventory (without customer identification), various labeling systems have been attempted on the already vulcanized mats. It is possible to vulcanize rubber labels to the finished mat backing by use of a small heated press but the process is excessive in cost and time requirement, taking more than several minutes. In the past attempts have been made to "burn" identification numbers into the already vulcanized rubber but this is also very unsatisfactory—unsightly, obnoxious odor, difficult to read. Also, systems using laser cutting have been investigated but these have required excessive capital investment.

Therefore, it is an object of the invention to provide a rubber or rubber-like backed dust control mat which can be readily treated to provide identification thereon.

Other objects and advantages will become readily apparent as the specification proceeds to describe the invention with reference to the accompanying drawings, in which:

FIG. 1 is a perspective view of the new and improved dust control mat with one edge lifted to show the identification strip;

FIG. 2 is a view similar to FIG. 1 showing identification placed in the identification strip, and FIG. 3 is a cross-section view taken on line 3—3 of FIG. 1.

In the preferred form of the invention the mats 10 consist of pile yarns 14 of cotton, polyester, nylon, etc. tufted through a woven or nonwoven substrate 16 of suitable material with the bottom 18 of the tufts adhered to the rubber or rubber-like backing 20 during vulcanization. Molded integral with the bottom of the backing 20 is an identification strip or label 22. Each of the mats commonly have a border portion 24 therearound.

The rubber or rubber-like backing 20 is a thermosetting material such as thermosetting nitrile rubber and the identification strip or label 22 is a thermoplastic material such as thermoplastic synthetic rubber. Examples of these would include halogenated polyolefin compositions, thermoplastic rubber, certain olefins such as high temperature polypropylene, thermoplastic nylon 6 and 6.6, thermoplastic ionomers. Preferably the strip or label 22 will be fairly small in length and width in comparison to the size of the mat with a thickness in the range of 0.010 to 0.035 inches thick (preferably 0.020).

The above-described mat can be stored with the identification label being left blank and then, when taken out of inventory, can be heated with a metal mold or die to imprint the particular customer's name, number and/or logo. Furthermore, since the label 22 is thermoplastic, the identification on same can be altered, if desired, by treating it with a hot iron to press out the previous identification. This is particularly helpful when a mistake has been made and the wrong identification has been molded in the label 22.

Thus, it can be seen that a dust control mat has been provided which allows the mats to be placed in general inventory and used for any desired customer by merely heat stamping the thermoplastic label vulcanized to the backing to provide any desired customer identification.

Although the preferred embodiment of the invention has been described, it is contemplated that many changes may be made without departing from the scope or spirit of the claims and it is desired that the invention be limited only by the claims.

I claim:

1. A dust control mat having an upper pile surface and a thermo-setting rubber-like backing the improvement comprising: a thin blank, unprinted thermoplastic strip of smaller dimensions than and vulcanized to said backing.

2. The mat of claim 1 wherein said strip of material has a thickness in the range of 0.010 to 0.035 inches.

3. The mat of claim 1 wherein the strip of material is approximately 0.020 inches thick.

* * * * *